No. 741,044. PATENTED OCT. 13, 1903.
C. W. KENNEDY, DEC'D.
S. H. KENNEDY, ADMINISTRATRIX.
STORAGE BATTERY.
APPLICATION FILED MAR. 21, 1902.
NO MODEL. 2 SHEETS—SHEET 1.

*Fig. 3.* *Fig. 4.*

Witnesses:-
Louis H. F. Whitehead
James C. Krayer

Inventor:-
Charles W. Kennedy
—by—
his Attorneys:-
Houston & Houston

No. 741,044. PATENTED OCT. 13, 1903.
C. W. KENNEDY, DEC'D.
S. H. KENNEDY, ADMINISTRATRIX.
STORAGE BATTERY.
APPLICATION FILED MAR. 21, 1902.
NO MODEL. 2 SHEETS—SHEET 2.

Witnesses:—

Inventor:—
Charles W. Kennedy
by his Attorneys:—

No. 741,044. Patented October 13, 1903.

UNITED STATES PATENT OFFICE.

CHARLES W. KENNEDY, OF RUTLEDGE, PENNSYLVANIA, SARA H. KENNEDY ADMINISTRATRIX OF SAID CHARLES W. KENNEDY, DECEASED; ASSIGNOR OF THREE-EIGHTHS TO EDWARD W. PATTON, OF PHILADELPHIA, PENNSYLVANIA.

STORAGE BATTERY.

SPECIFICATION forming part of Letters Patent No. 741,044, dated October 13, 1903.

Application filed March 21, 1902. Serial No. 99,292. (No model.)

*To all whom it may concern:*

Be it known that I, CHARLES W. KENNEDY, a citizen of the United States, and a resident of Rutledge, Delaware county, Pennsylvania, have invented certain Improvements in Storage Batteries, of which the following is a specification.

My invention relates to certain improvements in that class of storage batteries in which a series of cells, trays, or cups are nested to form a battery of required size, my present invention being an improvement upon the battery described and claimed in my former patent, No. 630,714, dated August 8, 1899. With this improved form of battery I prefer to use electrodes made in accordance with the plan described and claimed in an application for patent filed by me July 30, 1901, Serial No. 70,240, although I do not wish to limit myself to such use. It will be understood, however, that such electrodes should have a special shape to conform to the other parts of the battery.

My invention is fully illustrated in the accompanying drawings, in which—

Figure 1:
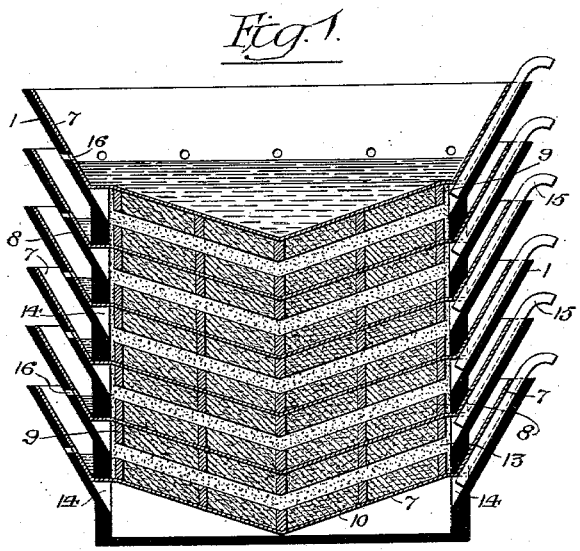
Figure 2:
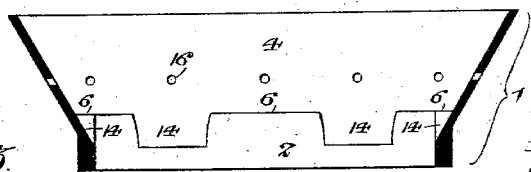

Figure 1 is a cross-sectional view of a battery formed of a nest of cells made in accordance with my invention. Fig. 2 is a sectional view of a single separating cup or tray made in accordance with my invention. Fig. 3 is an elevation of one of the electrodes for use in connection with my battery. Fig. 4 is another elevation of said electrode looking in the direction of the arrow, Fig. 3; and Figs. 5, 6, 7, and 8 illustrate details of my invention.

In the drawings herewith, 1 represents a bottomless tray having a rectangular lower portion 2 with comparatively thick vertical walls, and 4 represents the upper rectangular portion of the tray whose walls flare from their connection with the lower portion 2. These trays, which may be made of rubber or other suitable non-conducting material, are shown nested in Figs. 1 and 5 and are so made that the lower thickened walls project toward the interior of the tray, forming a shelf 6, which affords a suitable support for each successive cell or tray used in forming the battery. These trays are adapted to receive the metallic containing-cells 7, which carry suitable composite plates 8 and 9, forming, respectively, the positive and negative electrodes. The containing-cells 7 are made, preferably, of sheet-lead struck up by suitable dies in the usual manner and shaped to form an angular concaved bottom portion 10, substantially as shown in the drawings. This cell exactly fits within the non-conducting trays 1 and is so shaped as to have an offset horizontal portion 11 resting upon the upper surface 6 of the lower rectangular portion of the non-conducting trays, while its upper portion lies directly against the flaring walls of said trays. When fitted in place, each containing cell and tray permits the reception of other non-conducting trays and containing-cells, and the battery may be constructed from any suitable number of trays and cells fitted in place in this manner. Secured by soldering, burning, or by other suitable means to the upper and lower surface of this containing cell or pan are the plates 8 and 9, forming the positive and negative electrodes, respectively. These elements may be those which are familiarly known as "pasted" electrodes, or they may be plates electrochemically formed substantially as described in my application for patent filed July 30, 1901, Serial No. 70,240. In the present instance I show an electrochemically-formed plate, the active material being shown at 12. It is essential, however, that the frame of the electrodes be firmly secured to the surface of the metallic containing-cell. Such construction provides a space between the plate or electrode on one side of one containing-cell and the plate of the next succeeding cell, which space should be filled in with some non-conducting material, as shown at 13, and for this purpose I may use asbestos, wool, or in some instances sand or other finely-divided non-conducting material.

I prefer to construct the containing-cells with a bottom, substantially as shown and described, for the purpose of readily dissipating any air-bubbles that may form in the center of the cell and tend to destroy or modify the electrical action, and for the purpose of readily carrying off the air so collected I provide the separating trays or cells 1 with cut-out portions 14 in the side walls 3 of the lower rectangular portion, and with these cut-out portions I connect tubes 15, substantially as shown in Fig. 1. The advantage of having these plates convex on their outer surface is to provide for the ready dissipation and exit of any gas or air bubbles that may form in the battery adjacent to said electrodes. Flat electrodes tend to collect air-bubbles on their under side, and their construction prevents the escape of such bubbles. It is well understood that such bubbles act as an insulator and interfere with the efficient production of the current. By having the inclined surface, however, such bubbles will tend to follow the same, being broken at once by the angle of said plates. Electrolyte is introduced into each separate containing-cell, being maintained at a proper height therein by perforations 16, extending through both the non-conducting tray and the conducting-cell. Such arrangement will serve to prevent splashing or violent overflow of the electrolyte. As these perforations are below the height of the next lower cell, the overflow from one cell will collect in the next lower one. In some instances I may provide a closure for the space around each cell in the nature of a wax or other suitable covering 17, (see Fig. 5,) thereby preventing the slopping over of the electrolyte when the battery is used for vehicles, and this covering is preferably provided with small apertures 18 for the escape of air or any gas that may be generated by electrolytic action. In this connection I find that in some instances channels 19 (see Figs. 4 and 8) may be made across the surface of the plates forming the electrodes for the purpose of dissipating or more readily conducting away air or any gas bubbles formed between the electrodes.

Figure 5:
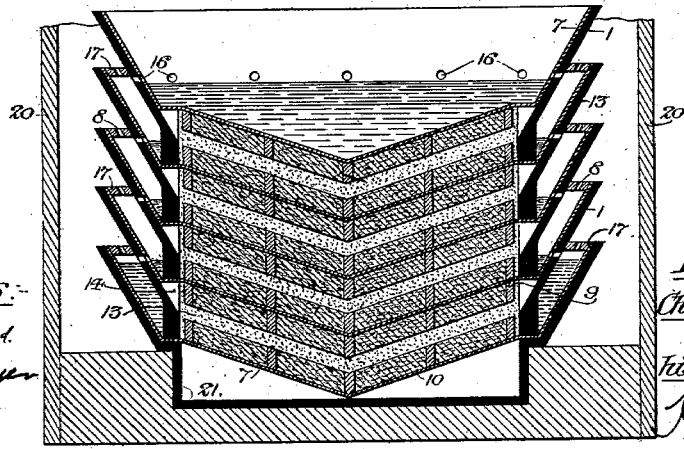

In Fig. 5 I have shown a series of cells nested within a suitable container or jar 20, the bottom 21 of which is shaped to form the lower non-conducting tray. In such form of battery it is preferable to assemble a separating medium between the electrodes that will not pack quite so closely as sand, and I also prefer to arrange some means for carrying off the air or gas formed between the several electrodes, preferably the tubes 15, described above. Each cell is complete in itself without connecting-terminals, as both a positive and negative electrode are arranged on the inside and outside of each lead-containing cell supported by the non-conducting trays. In some forms of battery I may arrange a pile of cells of any convenient number and use with them at certain intervals non-conducting trays having bottoms, whereby I can connect the cells in multiple. For such purpose of course it will be necessary to provide conducting-strips between such intervening insulating-trays.

Figure 6:
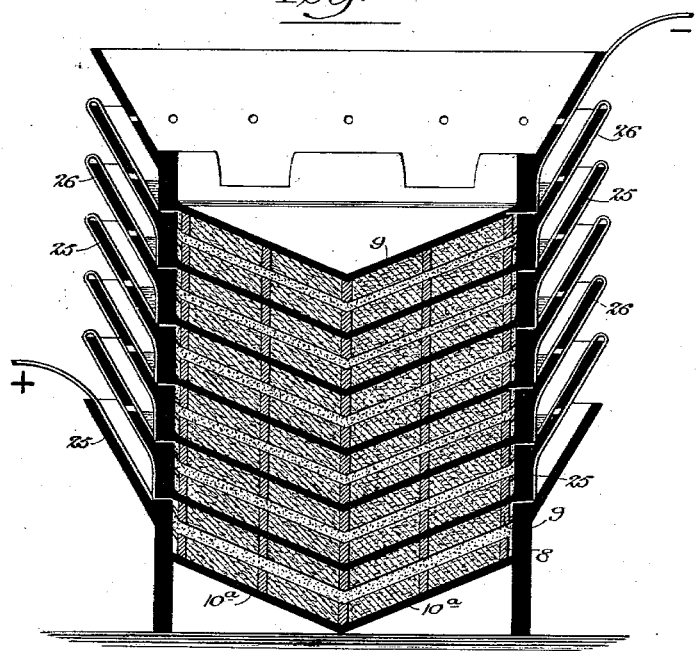
Figure 7:
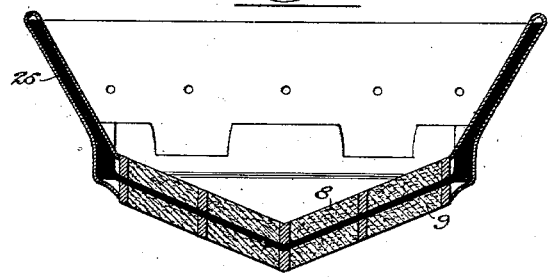

In some instances I may prefer to form a battery from a series of non-conducting containing-trays of a shape which combines that of the usual separator-tray and the lead-containing cell—such, for instance, as that shown at 25 in Figs. 6 and 7. This form of tray is provided with a concaved bottom $10^a$, to which bottom the positive and negative electrodes are secured in any suitable manner, as before described. As this containing-tray is made of non-conducting material, it is necessary, of course, to provide the metallic strips 26 for forming a connection between the respective positive and negative electrodes carried by said trays 25.

Figure 8:
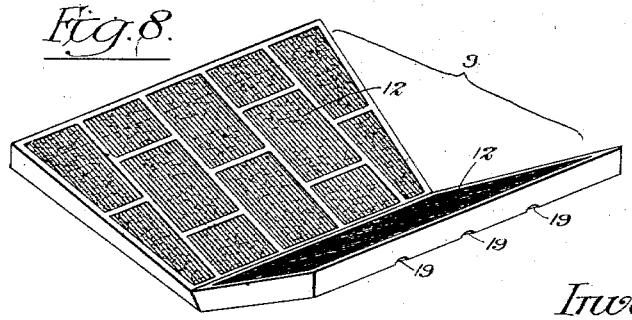

In Fig. 8 I have shown a perspective view of a plate made in accordance with my invention to form one of the electrodes and shaped to fit the lead-containing cells 7 of Figs. 1, 3, 4, and 5 or the trays 25. (Shown at Figs. 6 and 7.) This plate may be either the positive or negative electrode.

Having thus described my invention, I claim and desire to secure by Letters Patent—

1. In a storage battery of the character described, the combination of a bottomless separator-tray, and a containing-cell carrying the electrodes and supported by said tray.

2. In a storage battery of the character described, the combination of a bottomless separator-tray having flaring sides and an inner offset supporting portion, and a containing-cell supported by said offset portion of the tray.

3. In a storage battery of the character described, the combination of a bottomless separator-tray having flaring sides and an inner offset supporting portion, a containing-cell supported by said offset portion, and positive and negative electrodes supported by said containing-cell.

4. In a storage battery of the character described, the combination of a bottomless separator-tray having flaring sides and an inner offset supporting portion, a containing-cell supported by said offset portion, and positive and negative electrodes supported by said containing-cell, said electrodes being secured to said containing-cell by soldering them to the surface of the same.

5. A separator for storage batteries of the character described, having a lower rectangular portion provided with side supports, an upper rectangular portion having flaring walls, said lower portion having cut-out portions for the free passage of the electrolyte or any gas-bubbles formed by electrolytic action.

6. In a storage battery of the character described, the combination of a series of bottomless separator-trays, a series of containing-cells nested within said trays, said cells being adapted to receive the electrolyte, and having also, together with the separator-trays, apertures for the passage of the electrolyte from one cell to the next.

7. The combination in a storage battery of the character described, of the bottomless separator-trays, containing-cells having positive and negative electrodes mounted within said trays, said trays and cells conforming to the shape of each other so as to be properly nested, and tubes affording communication between the atmosphere and the space between each positive and negative electrode for the free discharge of any air or gas bubbles formed by the electrolytic action.

8. In a storage battery of the character described, the combination of the separator-trays, containing-cells carrying positive and negative electrodes adapted to said trays, and insulating material interposed between the positive and negative electrodes of opposing cells.

9. A containing-cell for use in a storage battery of the character described, having a rectangular bottom V-shaped in cross-section, and positive and negative electrodes shaped to conform to and secured to said cell both inside and outside the same, said electrodes being grooved for the purpose of dissipating and assisting the discharge of any air or gas bubbles formed by the electrolytic action.

10. A storage battery of the character described having a series of bottomless non-conducting supporting-trays, a series of lead-containing cells having positive and negative electrodes arranged within said trays, a shell or casing for holding said battery, and a bottom in said shell shaped to receive and support the lower containing-cell of the battery, substantially as described.

In testimony whereof I have signed my name to this specification in the presence of two subscribing witnesses.

CHARLES W. KENNEDY.

Witnesses:
MURRAY C. BOYER,
JOS. H. KLEIN.